A. E. AYER.
CHECK PROTECTOR.
APPLICATION FILED NOV. 19, 1908.
982,782.
Patented Jan. 31, 1911.
3 SHEETS—SHEET 2.
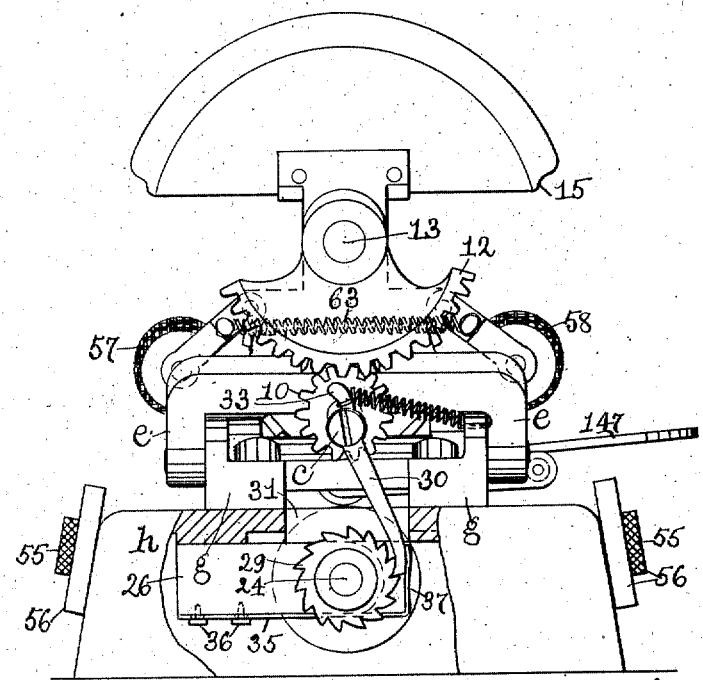
Fig. 3.
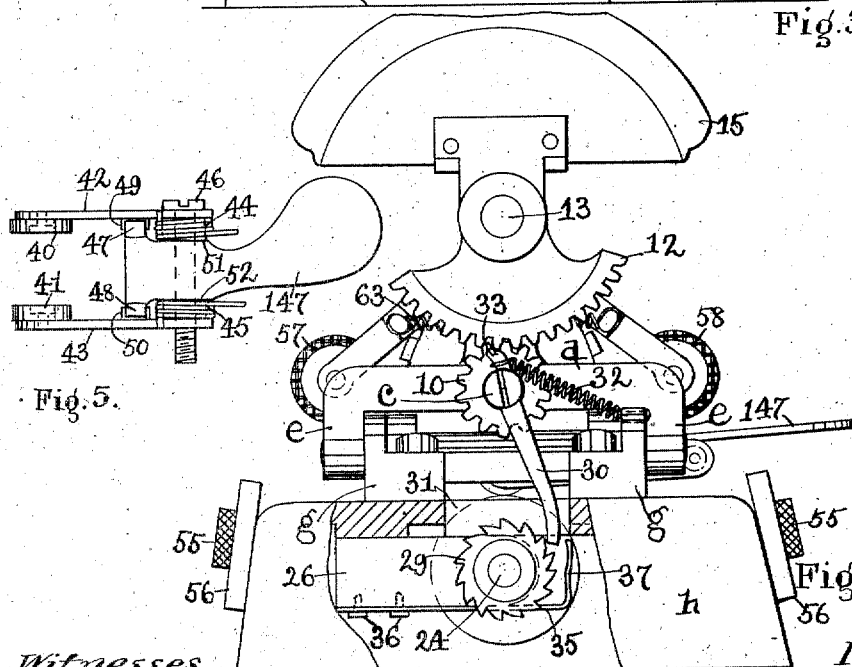
Fig. 5.
Fig. 4.
Witnesses.
C. H. Gannett
J. Murphy
Inventor
Albert E. Ayer
by Jos. H. Churchill
atty.

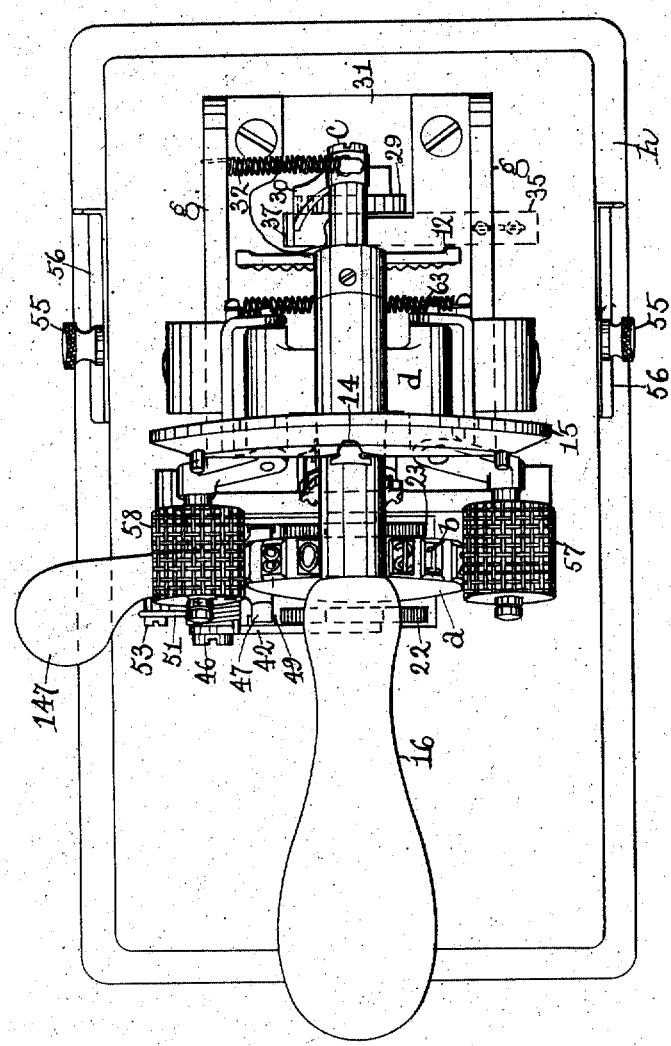

UNITED STATES PATENT OFFICE.

ALBERT E. AYER, OF BOSTON, MASSACHUSETTS, ASSIGNOR, BY DIRECT AND MESNE ASSIGNMENTS, TO UNIVERSAL MANUFACTURING COMPANY, OF BOSTON, MASSACHUSETTS, A CORPORATION OF MASSACHUSETTS.

CHECK-PROTECTOR.

982,782.  Specification of Letters Patent.  Patented Jan. 31, 1911.

Application filed November 19, 1908. Serial No. 463,398.

*To all whom it may concern:*

Be it known that I, ALBERT E. AYER, a citizen of the United States, residing in Boston, county of Suffolk, and State of Massachusetts, have invented an Improvement in Check-Protectors, of which the following description, in connection with the accompanying drawings, is a specification, like letters on the drawings representing like parts.

This invention relates to apparatus for marking checks and is an improvement upon the apparatus shown and described in U. S. Patent No. 861,695 granted to me July 30, 1907.

The present invention has for its object to simplify and improve the machine shown and described in the patent referred to, in a manner as will be described.

Figure 1:
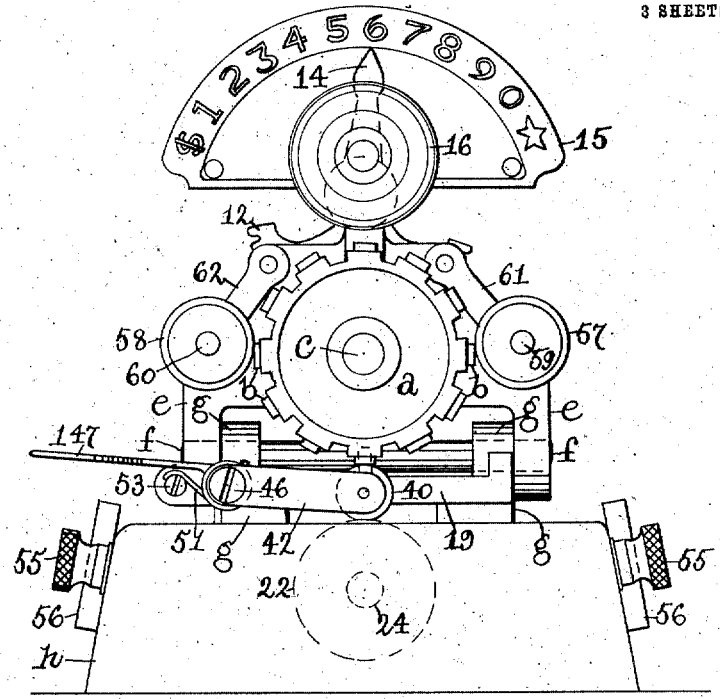
Figure 2:
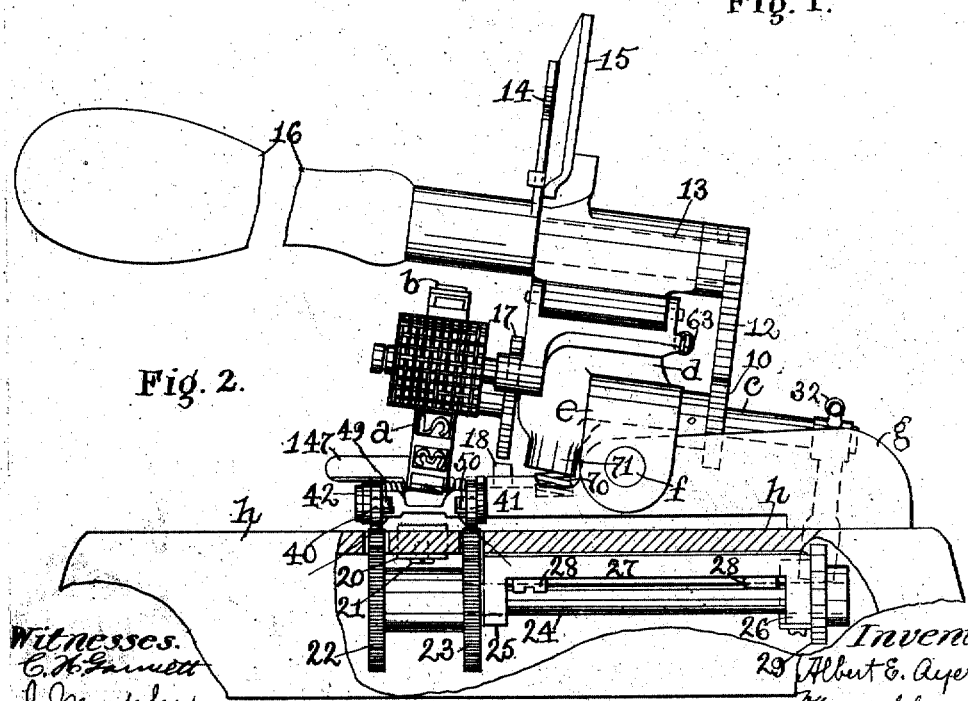

Figure 1 is a front elevation of a machine embodying this invention. Fig. 2, a side elevation of the machine shown in Fig. 1, looking toward the left. Fig. 3, a rear elevation of the machine shown in Fig. 1, with parts broken away. Fig. 4, a like elevation with the parts in the position they occupy while the check is being stamped. Fig. 5, a detail of the presser to be referred to, and Fig. 6, a plan of the machine shown in Fig. 1.

Referring to the drawings, the rotatable cylinder or wheel $a$ provided on its periphery with marking devices or type $b$, indicative of the numerals zero to 9 and also the dollar sign and a star, is fast on a rotatable shaft $c$ substantially as in the patent referred to. The shaft $c$ has bearings in a frame or carrier $d$, which in the present instance is provided with laterally extended arms $e$, mounted on pivot pins or studs $f$, extended from upright walls or ribs $g$ attached to the upper surface of a base $h$, which construction enables the carrier $d$ for the type-wheel to be pivoted substantially close to the latter, with the result that a more powerful impression of the type on the check may be obtained, with the least expenditure of power and at the same time, obtaining a more compact and sensitive machine.

The type-wheel shaft $c$ is extended through the carrier $d$ and has fast on it a pinion 10, which meshes with and is driven by a segmental gear 12 fast on a shaft 13 having bearings in the carrier $d$ above the shaft $c$, substantially as in the patent referred to, and provided in front of the carrier $d$ with a pointer or index 14, which coöperates with a dial or plate 15 attached to said carrier and provided with numbers from 0 to 9 and with the dollar sign and with the star, to correspond with the type or marking devices $b$ on the type-wheel $a$. The shaft 13 is also provided with the handle 16 as in the patent referred to.

The type-wheel shaft $c$ has fast on it a toothed wheel 17, which coöperates with a stud or pin 18 on the base $h$, said stud being shown as projecting from a cross-bar 19 attached to or forming part of the side ribs $g$ (see Fig. 1).

The type-wheel $a$ coöperates with a stationary bed 20 secured as by screws 21 (see Fig. 2) to the underside of the base $h$, which is provided with a suitable opening up through which the bed 20 may extend above the base, and on opposite sides of the said bed, that is, in front and at the rear of the same, are located feed wheels 22, 23, (see Fig. 2), which are fast on a shaft 24 located below the top of the base $h$ and extended toward the rear thereof. The feed wheel shaft 24 is mounted to rotate in a frame comprising arms 25, 26, which are joined by a bar 27, which is detachably secured to the underside of the top plate of the base $h$ as by screws 28.

The feed-wheel shaft 24 at its rear end has fast on it a ratchet wheel 29, with which coöperates a push-pawl 30 pivotally mounted on the rear end of the type-wheel shaft $c$ and having its lower end extended down through a slot or opening 31 in the top plate of the base $h$, to engage the ratchet wheel 29. The pawl 30 is held in engagement with the ratchet wheel by a spring 32 having one end engaged with a projection 33 on the pawl and the other end fastened to one of the side ribs $g$.

In order to prevent over-feeding of the check after each stamping operation, a brake is provided which comprises as herein shown a flat spring 35 secured as by screws 36 to the arm 26 and having an upturned end or arm 37 substantially in line with the ratchet wheel 29, so that when the push pawl 30 is moved downward to rotate the ratchet wheel as represented in Fig. 3, the said pawl will engage the spring arm 37, which presses it against the ratchet wheel and thereby places a brake or drag on the ratchet wheel, with the result that the feed wheel shaft 24, is turned a definite amount at each downward movement of the pawl and the check is fed a uniform distance after each impression or marking. The feed wheels 22, 23, have cooperating with them presser rolls or wheels 40, 41, which are located above the base $h$ in line with the feed wheels and are loosely mounted in the free end of levers 42, 43, (see Fig. 5) preferably disconnected from each other so as to move independently of each other, in order to compensate for variations in the thickness of the check being marked or stamped.

The levers 42, 43 are provided as shown with bosses 44, 45, which are mounted on a common pivot pin 46 screwed into the cross bar 19, and said levers may be raised by a finger lever 147, which is mounted to turn on the pivot pin 46 and is provided with slotted ears 47, 48, between which are extended lugs 49, 50, on the levers 42, 43. The presser levers 42, 43 are normally held down with their rolls 40, 41, in contact with the feed wheels 22, 23 by springs 51, 52 coiled about the bosses 44, 45 on the said levers and having one end engaged with a stationary pin 53 attached to the cross bar 19, and their other ends engaged with the upper surface of the levers 42, 43. The slots in the ears 47, 48 on the levers 42, 43 are deeper than the thickness of the lugs 49, 50, (see Fig. 2), so that the levers 42, 43 may move independently of each other to compensate for variation in the thickness of the check.

By locating the feed wheels on opposite sides of the bed 20, that is, in front and back of the same, and providing a presser for each wheel, the check is firmly held on opposite sides of the part being stamped, which results in a better impression and a straighter feed of the check is obtained, and this is true whether the presser levers are capable of independent movement or not.

The base $h$ may have attached to its sides as by the screws 55, gage plates or bars 56, which are adjustable toward and from the bed 20.

The type-wheel has coöperating with it ink rolls 57, 58, which are mounted on pins 59, 60, carried by levers 61, 62, pivoted to the opposite sides of the carrier $d$ and connected by a spring 63, which holds the ink rolls in engagement with the type $b$ so as to supply the latter with ink. The ink rolls are rotated on their pins 60, 61, by the rotation of the type wheels $a$.

In operation, the finger lever 147 is depressed by the operator and the check is placed over the bed and is properly positioned by the gage bar 56, after which the lever 147 is released and the check is firmly gripped between the presser rolls 40, 41, and the feed wheels 22, 23. The operator then turns the handle 16 until the pointer or index 14 registers with the proper number or mark on the dial 15, and when the pointer is thus positioned, the handle is depressed, which action turns the carrier $d$ on its pivots $f$ and brings the type-wheel into contact with the check to mark the same. The downward pressure on the handle is then removed and the carrier $d$ is turned in the opposite direction so as to elevate the type-wheel $a$, which is accomplished by a spring 70 resting on the base $h$ and extended up into a socketed boss 71 on the carrier (see Fig. 2). On the downward or impression movement of the type-wheel $a$, the rear end of its shaft $c$ is elevated and the pawl 30 is moved up into the position shown in Fig. 4, and on the upward movement of the type wheel, the rear end of its shaft $c$ is moved downward to effect rotation of the ratchet wheel 29 and the feed wheel shaft 24 the distance of one tooth of the ratchet wheel, thereby effecting the feed of the check to present a fresh portion to the marking device, which is next brought into line with the bed by turning the handle 16 so as to bring the pointer opposite the desired numeral or mark on the dial.

Claims:

1. In an apparatus of the class described, in combination, a rotatable wheel or member provided on its periphery with marking devices capable of being brought into contact with the check to be marked, a shaft on which said wheel is mounted, a pivoted carrier or frame supporting said shaft and through which the latter is extended, means to rotate said shaft, a base upon which said carrier or frame is pivotally mounted above the same, a bed supported by said base below said wheel and with which said wheel coöperates, feed wheels located below said base and extended up through the same at the front and rear sides of said bed, a shaft upon which said feed wheels are mounted, a ratchet wheel on said feed wheel shaft, and a pawl pivotally mounted on the type wheel shaft and engaging said ratchet wheel, substantially as described.

2. In an apparatus of the class described, in combination, a rotatable wheel or member provided on its periphery with marking devices capable of being brought into contact with the check to be marked, a shaft on which said wheel is mounted, a pivoted carrier or frame supporting said shaft and through which the latter is extended, means to rotate said shaft, a bed with which said wheel coöperates, feed wheels located at the front and rear sides of said bed substantially in vertical alinement with the shaft of said marking wheel, a shaft on which said feed wheels are mounted, a ratchet wheel on said feed wheel shaft, a pawl pivotally mounted on the type-wheel shaft and coöperating with said ratchet wheel, presser rolls coöperating with said feed wheels and separated from each other for the passage between them of said marking member, levers carrying said presser rolls, and a finger lever to move said presser levers away from said feed wheels, substantially as described.

3. In an apparatus of the character described, in combination, a rotatable wheel or member provided on its periphery with marking devices, a shaft on which said wheel is mounted, a pivoted carrier or frame supporting said shaft and through which the latter is extended, means to rotate said shaft, a bed with which said wheel coöperates, feed wheels located on opposite sides of said bed, a shaft on which said feed wheels are mounted, a ratchet wheel on said feed wheel shaft, a pawl pivotally mounted on the type wheel shaft and coöperating with said ratchet wheel, presser rolls coöperating with said feed wheels, levers carrying said presser rolls and capable of movement independently of each other, and means to move said presser rolls away from said feed wheels.

4. In an apparatus of the class described, in combination, a rotatable wheel or member provided on its periphery with marking devices capable of being brought into contact with the check to be marked, a shaft on which said wheel is mounted, a bed coöperating with said marking wheel or member, feed wheels located at the front and rear sides of the bed, a shaft on which said feed wheels are mounted, presser levers separated from each other for the passage between them of said marking member and coöperating with said feed wheels to firmly hold a check while being marked on opposite sides of the bed and to effect a straight feed of the same after being marked, means to effect movement of the marking member toward said bed, and means actuated by the shaft of said rotatable marking member to rotate said feed wheels, substantially as described.

5. In an apparatus of the class described, in combination, a vertically arranged rotatable wheel or member provided on its periphery with marking devices, a substantially horizontal shaft on which said wheel is mounted, a bed located below the periphery of said wheel substantially in line therewith, feed wheels mounted on a shaft extended in the same direction as the shaft of the marking wheel and substantially in vertical alinement therewith, said feed wheels being separated on their shaft by a space greater than the width of said bed and located at the front and rear sides thereof, substantially parallel presser levers located above said feed wheels at the front and rear sides of the said bed and extended laterally toward one side of said machine, said levers being capable of being moved independently, and a finger lever extended laterally toward one side of the machine and coöperating with said levers to move them simultaneously, substantially as described.

6. In an apparatus of the class described, in combination, a bed, feed wheels located at the front and rear sides of said bed, substantially parallel levers located above said feed wheels and extended laterally in the same direction toward one side of the apparatus, said levers being capable of movement independently, and means accessible from one side of the apparatus for simultaneously lifting said levers away from said feed wheels.

7. In an apparatus of the class described, in combination, a rotatable wheel or marking member provided on its periphery with marking devices capable of being brought into contact with the check to be marked, a shaft on which said wheel is mounted, a pivoted carrier or frame through which said shaft is extended, an operating shaft for the shaft of said marking member, said operating shaft being supported by said carrier, gearing connecting said shafts, a base upon which said carrier is pivotally mounted, a bed carried by said base and with which said marking member coöperates, feed wheels located on opposite sides of said bed, a shaft located below said base and supported thereby, said feed wheel shaft being extended in the same direction as the shaft of the marking member, a ratchet wheel on the rear end of the feed wheel shaft, and a pawl carried by the shaft of the marking member and extended down through the base to engage said ratchet wheel, substantially as described.

8. In an apparatus of the class described, in combination, a rotatable wheel or member provided on its periphery with marking devices, a substantially horizontal shaft on which said wheel is mounted, a bed located below the periphery of said marking wheel or member and coöperating therewith, feed wheels located at the front and rear sides of the bed with their centers below and substantially in vertical alinement with the center of said marking wheel or member, presser rolls located above said feed wheels on opposite sides of said bed and marking wheel or member with their centers substantially in vertical alinement with the centers of said marking wheel and feed wheels, substantially parallel levers located on opposite sides of said bed and carrying said presser rolls and both extended in the same direction toward one side of the apparatus and movable independently of each other, and means to effect simultaneous movement of the said levers and lift the presser rolls away from the feed wheels and toward the marking wheel or member, substantially as described.

9. In an apparatus of the class described, in combination, a rotatable wheel or member provided on its periphery with marking devices, a substantially horizontal shaft on which said wheel is mounted, a bed located below the periphery of said marking wheel or member and coöperating therewith, feed wheels located at the front and rear sides of the bed with their centers below and substantially in vertical alinement with the center of said marking wheel or member, presser rolls located above said feed wheels on opposite sides of said bed and marking wheel or member with their centers substantially in vertical alinement with the centers of said marking wheel and feed wheels, substantially parallel levers located on opposite sides of said bed and extended laterally toward one side of the apparatus, said levers carrying said presser rolls and being movable independently of each other, and means for simultaneously lifting said levers and presser rolls away from the feed rolls and toward the marking wheel or member.

10. In an apparatus of the class described, in combination, a bed, feed wheels located at the front and rear sides of said bed, presser rolls located above said feed wheels and coöperating therewith, substantially parallel levers carrying said presser rolls and extended laterally in the same direction toward one side of the apparatus, said levers being capable of movement independently, and means accessible from one side of the apparatus for simultaneously lifting said levers and rolls away from said feed wheels.

In testimony whereof, I have signed my name to this specification in the presence of two subscribing witnesses.

ALBERT E. AYER.

Witnesses:
JAS. H. CHURCHILL,
J. MURPHY.